(12) United States Patent
Byun

(10) Patent No.: US 6,445,728 B1
(45) Date of Patent: Sep. 3, 2002

(54) METHOD OF ESTABLISHING SEARCH WINDOW SIZE FOR A MOBILE STATION IN A CELLULAR SYSTEM

(75) Inventor: Sung-il Byun, Seoul (KR)

(73) Assignee: Samsung Electronics, Co., Ltd. (KR)

( * ) Notice: Subject to any disclaimer, the term of this patent is extended or adjusted under 35 U.S.C. 154(b) by 0 days.

(21) Appl. No.: 09/344,584

(22) Filed: Jun. 25, 1999

(30) Foreign Application Priority Data

Jun. 25, 1998 (KR) .............................................. 98-24069

(51) Int. Cl.$^7$ ................................................. H03D 3/24
(52) U.S. Cl. ....................... 375/142; 375/150; 375/343; 370/320; 370/335; 370/342; 370/441
(58) Field of Search ................................. 375/142, 144, 375/148, 150, 343, 367; 370/320, 335, 342, 441, 515

(56) References Cited

U.S. PATENT DOCUMENTS

| | | | |
|---|---|---|---|
| 5,109,390 A | | 4/1992 | Gilhousen et al. ............. 375/1 |
| 5,297,161 A | | 3/1994 | Ling .............................. 375/1 |
| 5,420,850 A | * | 5/1995 | Umeda et al. ................. 370/18 |
| 5,577,022 A | | 11/1996 | Padovani et al. ............. 370/13 |
| 5,627,835 A | * | 5/1997 | Witter ........................ 370/320 |
| 5,644,591 A | * | 7/1997 | Sutton ........................ 375/200 |
| 5,710,768 A | | 1/1998 | Ziv et al. .................... 370/342 |
| 5,726,982 A | | 3/1998 | Witter ........................ 370/335 |
| 5,781,543 A | * | 7/1998 | Ault et al. ................... 370/342 |
| 5,790,589 A | | 8/1998 | Hutchison, IV et al. ..... 375/200 |
| 5,805,648 A | * | 9/1998 | Sutton ........................ 375/367 |
| 5,903,844 A | | 5/1999 | Bruckert et al. ............ 455/456 |
| 6,044,104 A | * | 3/2000 | Watanabe .................... 375/200 |
| 6,101,175 A | * | 8/2000 | Schorman et al. .......... 370/331 |
| 6,144,691 A | * | 11/2000 | Kenney ....................... 375/130 |

* cited by examiner

Primary Examiner—Stephen Chin
Assistant Examiner—Dac V. Ha
(74) Attorney, Agent, or Firm—Dilworth & Barrese, LLP

(57) ABSTRACT

A method of establishing a search window size for a mobile station in a cellular system is disclosed. For the mobile station searching for a pilot signal of base transceiver station (BTS), the information of maximum index being outputted from the mobile station is gathered, wherein the maximum index is an index number at which the strongest signal is detected within a predetermined window size. For the gathered maximum indexes, confidence level is established and mean value is calculated and then confidence interval is calculated for the gathered maximum indexes using the established confidence level and calculated mean value. A maximum offset of the search window to be applied to the present radio morphology of the cellular system is calculated from the calculated confidence interval and a search window to be applied to the present radio morphology is estimated by increasing the maximum offset by two times. Therefore, the present invention is applicable to the characteristic of the mobile station and radio morphology of the cellular system by estimating the search window using the search result data gathered from the mobile station.

7 Claims, 3 Drawing Sheets

METHOD OF ESTABLISHING SEARCH WINDOW SIZE FOR A MOBILE STATION IN A CELLULAR SYSTEM

CLAIM OF PRIORITY

This application makes reference to, incorporates the same herein, and claims all benefits accruing under 35 U.S.C. §119 from an application entitled METHOD FOR ESTABLISHING SEARCH WINDOW SIZE OF A MOBILE STATION IN A CELLULAR SYSTEM earlier filed in the Korean Industrial Property Office on June 25, 1998, and there duly assigned Serial No. 1998-24069.

BACKGROUND OF THE INVENTION

1. Field of the Invention

The present invention relates to a method of establishing a search window size of a mobile station in a cellular system, more particularly, a method for estimating the search window size wherein the mobile station searches for a pilot signal transmitted from a base transceiver station (BTS) in the cellular system.

2. Description of the Related Art

A cellular mobile telecommunication system divides the total service coverage into a plurality of radio BTS areas. A BTS area, also called a cell, has a small service coverage area. Several BTS's may be controlled centrally by a mobile switching center (MSC), which makes it possible for subscribers to continue to communicate with each other while moving between cells.

FIG. 1 illustrates a design configuration of a cellular system using code division multiple access (CDMA) technology. As illustrated in FIG. 1, the cellular system includes a mobile station (MS) 40, which is provided with mobile telecommunication services; base transceiver stations (BTS) 30, 31 which provide the mobile station 40 with services; base station controller (BSC) 20 controlling the base transceiver stations 30, 31; and mobile switching center (MSC) 10 connecting the base station controller 20 to the general public switched telephone network (PSTN) 11. The mobile switching center 10 provides services by obtaining the information about the mobile station 40 from home location register (HLR) 12 and visitor location register (VLR) 13.

In the CDMA system configured as above, a link from the base transceiver station to the mobile station is called a forward link and a link from the mobile station to the base transceiver station is called a reverse link. All forward links in a base transceiver station have the same pseudo-random noise (PN) sequence time offset. The PN offset is transmitted via a pilot channel, called a pilot signal, as one of the forward channels. The pilot signal is an identification signal which identifies the plurality of base transceiver stations in the CDMA system.

The CDMA mobile station always monitors the pilot signal in order to obtain a good quality signal on the forward channel. The mobile station located within the service coverage of the base transceiver station uses the pilot signal for synchronization. The mobile station can acquire a timing of the forward CDMA channel from the pilot signal and obtain the phase reference for coherent demodulation.

The CDMA mobile station can simultaneously communicate with a plurality of base transceiver stations while differentiating the code. The above function describes a soft handoff, where a searcher is used for selecting the best quality path among the plurality of base transceiver station's paths. That is, each of the base transceiver stations transmits a pilot signal having its own PN offset, so the mobile station searches for the timing location from which the strongest pilot signals are received. This step is called pilot signal acquisition.

After the mobile station receives the pilot signal from the base transceiver station, the base transceiver station continues to instruct the mobile station to search for transmitted pilot signals from other base transceiver stations as well as using a particular timing location for each base transceiver station. The CDMA system performs transmission diversity schemes using multiple digital receivers to reflect signals transmitted from a base transceiver station through the multipath. Such multiple digital receivers are called a fingers.

At this time, the mobile station has the timing interval to search for the pilot signals and the base transceiver station provides the mobile station with a particular timing interval for each pilot signal, i.e., window size via a paging channel. When the mobile station is initially connected to the base transceiver station, the base transceiver station transmits the search window corresponding to each set per active set/neighbor set/candidate set/remain set, to the mobile station. The search window transmitted from the base transceiver station is fixed for the corresponding base transceiver station.

The searcher of the mobile station detects the strongest pilot signal, i.e., PN offset, continuously within the search window among the currently connected plurality of pilot signals. If the search window is too large, it takes too much time to search for the strongest pilot signal, and if it is too small, it is difficult to get the exact search result. Therefore, it is very important to establish the appropriate search window size in order to obtain a good quality signal on the forward channel.

Two methods of establishing the search window size according to the prior art is a modeling method and a measuring method. The modeling method estimates the search window size through the multipath model. However, the search window is variable according to the multipath model which creates a practical limitation based on the field environment.

The measuring method measures the search window in such a way that a receiver measures the delay spread through a power profile for the outputted continuous wave. This method has more reliability than the modeling method. However, a disadvantage is that the method does not consider the characteristic of the mobile station, itself.

U.S. Patent No. 5,726,982, entitled "Artificial Window Size Interrupt Reduction System For CDMA Receiver" discloses a method for acquiring phase information of a PN sequence via the mobile station in the CDMA system by previously establishing the window size. The method establishes the search window center per active/candidate/neighbor/remain set and establishes the search window by adding an upper/lower limit which is provided from the base station to the search window center. However, the disadvantage remains in that the method does not consider the characteristic of the mobile station or the characteristic of the practical radio morphology.

SUMMARY OF THE INVENTION

To solve the disadvantages of the prior art as stated above, the present invention provides a method of establishing a search window size for a mobile station in a cellular system having a present radio morphology. One preferred embodiment of the method according to the present invention, wherein the mobile station is provided with communication services from a plurality of base transceiver stations (BTSs), and each of the plurality of BTSs has an inherent pilot signal, and the mobile station searches for the pilot signal at each searcher position having a constant time interval within a search window on a time-axis, includes: finding a correlation energy value at each searcher position by which a searcher of the mobile station searches for pilot signals received from the plurality of BTSs at each searcher position within a predetermined first search window and outputting a result of the searching; gathering the result of the searching outputted from the searcher of the mobile station using a diagnostic monitor (DM) connected to the mobile station; and estimating the size of a second search window to be applied to the present radio morphology based on the gathered result of the searching and applying the second search window size to the mobile station.

Another preferred embodiment of the method according to the present invention, wherein the mobile station is provided with communication services from a plurality of base transceiver stations (BTSs), and each of the plurality of BTSs has an inherent pilot signal, and the mobile station searches for the pilot signal at each searcher position having a constant time interval within a search window on a time-axis, includes: finding a correlation energy value at each searcher position by which a searcher of the mobile station searches for pilot signals received from the plurality of BTSs at each searcher position within a predetermined first search window; gathering maximum index samples from the searcher of the mobile station by a diagnostic monitor (DM) connected to the mobile station, wherein the maximum index samples include information denoting the location of a searcher position from a center of the first search window, wherein the searcher position has the highest correlation energy value within the first search window; establishing confidence level value, p, for the gathered maximum index samples; calculating a mean value, m, and a standard deviation, σ, for the gathered maximum index samples; calculating a confidence interval for the gathered maximum index samples using the established confidence level value, p, the calculated mean value, m, and standard deviation, σ, and estimating the size of a second search window to be applied to the present radio morphology using the calculated confidence interval and applying the estimated second search window size to the mobile station.

DETAILED DESCRIPTION OF THE PREFERRED EMBODIMENTS

In the present invention, a mobile station uses search result data from a searcher and estimates a search window from the data.

Figure 1:
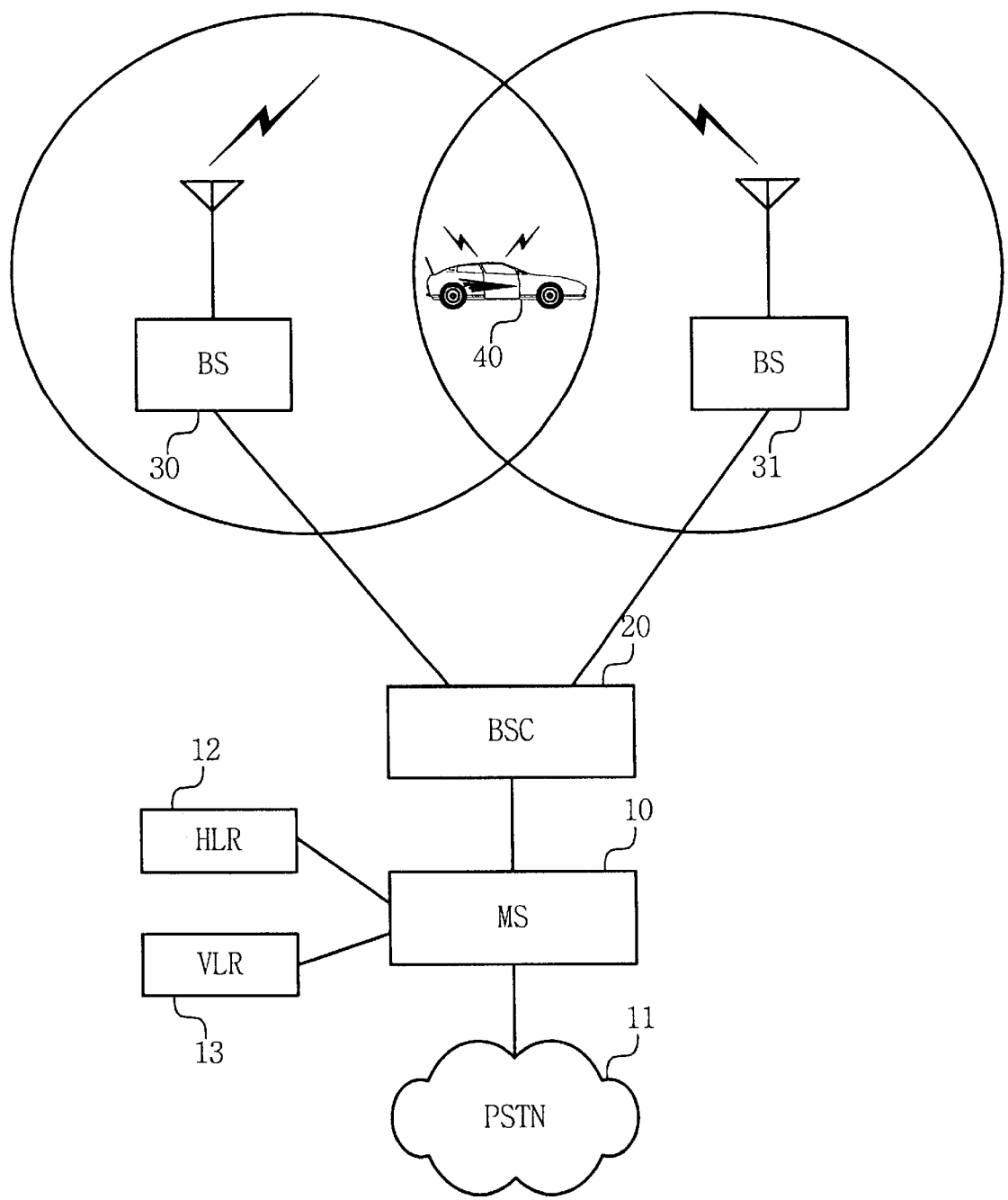
FIG. 1 is a block diagram illustrating the configuration of a cellular system using the conventional code division multiple access (CDMA) technology.
Figure 2:
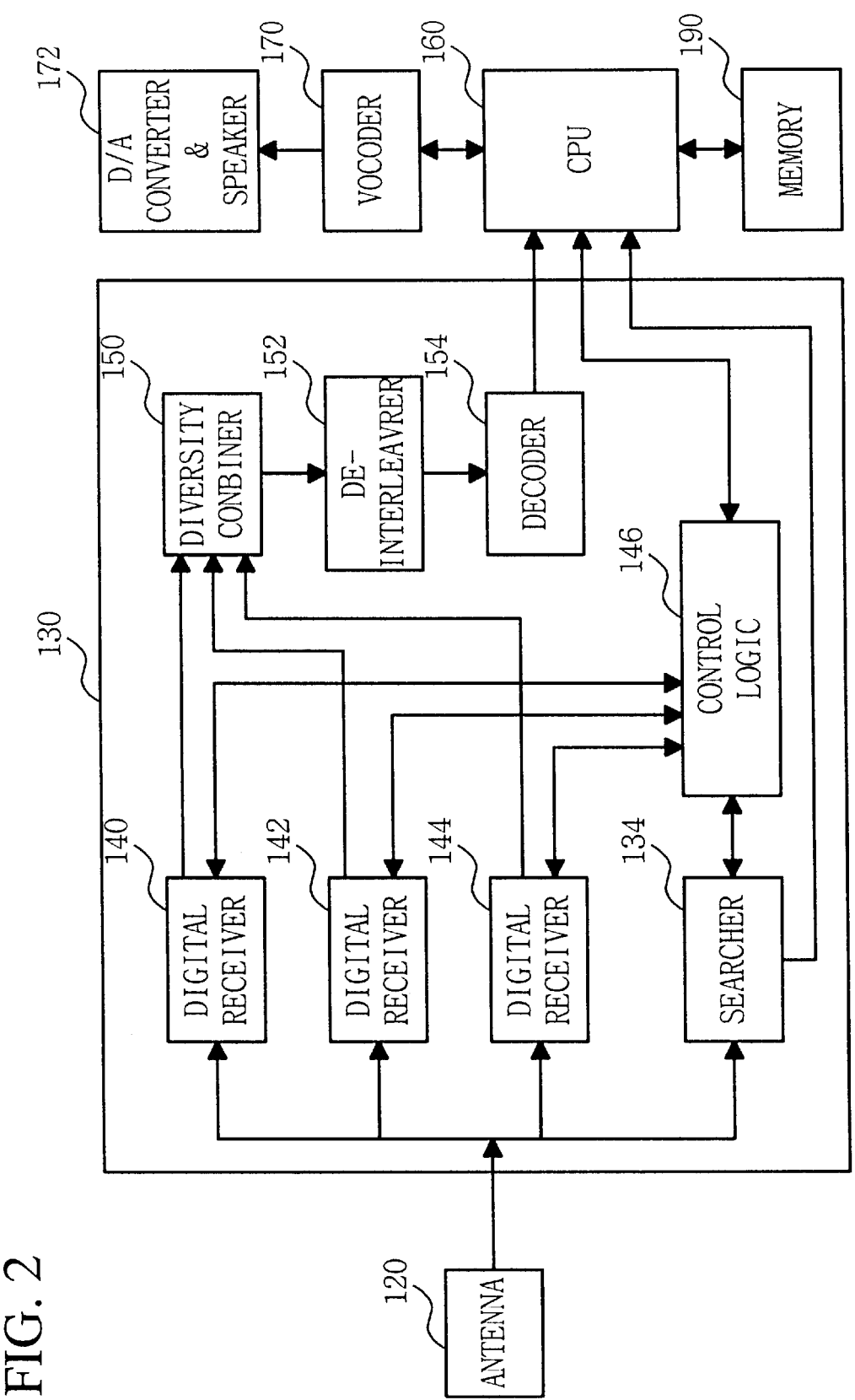
FIG. 2 is a block diagram illustrating a receive unit of a CDMA mobile station in accordance with the present invention.

FIG. 2 illustrates a structure of a receive unit of a CDMA mobile station which is used in the present invention.

The cellular radio signal received in antenna 120 is inputted to receive unit 130. The received signal is inputted to a plurality of digital receivers (fingers) 140, 142, 144 and a searcher 134. Three digital receivers 140, 142, 144 and control logic 146 constitutes a demodulation finger which demodulates multipath information. The multipath information is then sent to a diversity combiner 150. The combined signal is inputted to a central processing unit (CPU) 160 through a de-interleaver 152 and a decoder 154. The CPU 160 sends the signal inputted from the decoder 154 to a vocoder 170 to output it to a digital-to-analog (D/A) converter and speaker 172.

The information of the control logic 146 is used by the searcher to search for a pilot signal. If the searching is completed by the searcher 134, the search result information is outputted to the CPU 160. The CPU 160 stores the search result in a memory 190.

If pilot signal(s) is(are) received from one or a plurality of base transceiver stations, the mobile station stores the received pilot signal(s) in a buffer for each searcher having a constant time interval on the time-axis. The pilot signals stored in the buffer are searched for at each searcher position by the searcher of the mobile station.

That is, the searcher finds a correlation energy value at each searcher position by comparing the energy of the pilot signal stored in the buffer to a predetermined standard energy value. The searcher compares the correlation energy values found at the each searcher position with each other and finds a searcher position having the strongest or highest correlation energy value. The search result is stored in the memory 190. If the searcher position having the strongest correlation value is found, the mobile station fixes the demodulation finger at the found searcher position.

For the search result information being stored in the memory, there is a maximum index (Search_Max_Index) and a maximum energy (Search_Max_Energy). The maximum index represents a searcher position at which the strongest energy is found as a result of the searching, and the maximum energy represents the detected energy value. The maximum index is used in the present invention.

The mobile station according to the present invention establishes the search window by referring to the maximum index being outputted from the searcher. The maximum index is outputted by a unit of ½ chip and it represents the information for the PN phase having the maximum energy for the corresponding PN offset, that is, timing location τ. Therefore, the maximum index is closely related to the search window found in the present invention.

The maximum index is the information which denotes the location of a searcher position (i.e., index) from a center of the first search window having the detected PN phase. If the maximum index is small, the search window may become smaller. On the contrary, if it is large, the searcher position may need to become larger in order to obtain a more exact search result.

For example, when the search window for the active set received from the base transceiver station is ±14 chips and the memory size established in the mobile station is ±12 chips, the search window center is 0 (zero). At this time, the searcher outputs the PN phase detected within the range of ±12 chips by a unit of ½ chip because the maximum allowable search window in the mobile station is ½ chip.

The present invention uses a definition of confidence level to estimate the search window from the maximum index information because the PN sequence represents the log-normal distribution based on the orthogonality of an auto-correlation characteristic.

Figure 3:
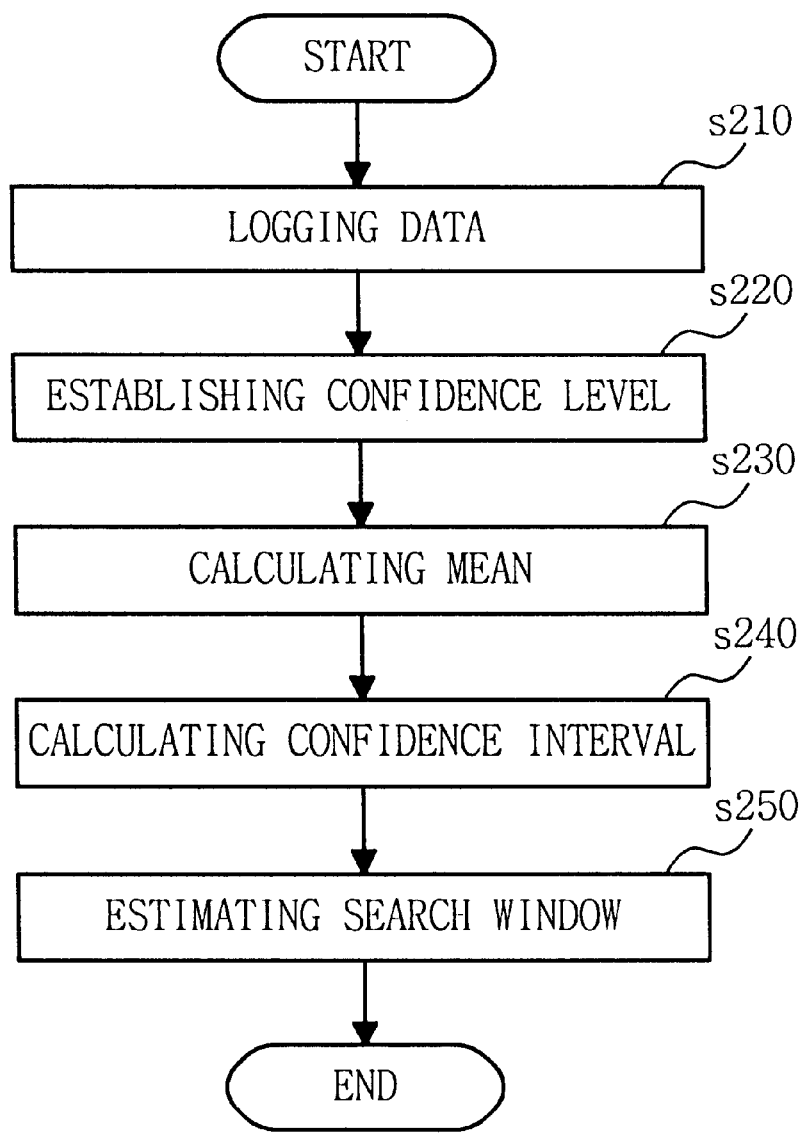
FIG. 3 is a flow chart illustrating a method for establishing a search window size of a mobile station in accordance with the present invention.

FIG. 3 shows a flow chart illustrating a method for establishing a search window size of a mobile station according to the present invention. As illustrated in FIG. 3, the method includes logging (i.e., gathering) search data at step 210, establishing the confidence level for the maximum indexes from the logged (gathered) data at step 220, calculating a mean value for the maximum indexes at step 230, calculating the confidence interval for the maximum indexes at step 240, and establishing the search window from the calculated confidence interval at step 250.

Hereafter, the preferred embodiment of the present invention will be described with reference to the drawings.

A user connects a diagnostic monitor (DM) to a mobile station and obtains logging search result data, particularly maximum index samples, repeatedly from the mobile station through the diagnostic monitor at step 210. The diagnostic monitor establishes a desirable confidence level, p, from the logged maximum index samples at step 220.

Here, the confidence level represents the probability of the sample mean in a particular interval, which is called a confidence interval, as is well known in the field of statistics. It is an object of the present invention to find an interval such that the possibility of the data samples being dense is high. Accordingly, the invention establishes a necessary confidence level and determines the corresponding confidence interval as a search window.

A method for establishing the confidence interval, that is, a search window from the established confidence level will now be described as follows.

When the samples form log-normal distribution, the predetermined confidence level, p, can be represented using the following equation 1.

$$1 - 2Q(k) = p = P\left[-k \leq \frac{x-m}{\sigma} \leq k\right] \quad \text{[Equation 1]}$$
$$= P[m - k\sigma \leq x \leq m + k\sigma]$$

Here, the Q(k) is a Q-function, which may be approximately represented as $$Q(k) = \frac{1}{\sqrt{2\pi}} \int_k^\infty e^{-x^2/2} dx,$$

where k is a variable that varies according to the number of maximum index samples, N.

Once k is determined, a mean value for the maximum index samples, m, is found and standard deviation, $\sigma$, is found at step 230. Using the m and $\sigma$, the statistical distribution for the maximum index samples can then be found.

Then, the confidence interval of data for the mean of maximum index samples is calculated using the following equation 2 considering N, the number of the maximum index sample, x, at step 240.

$$m - k\sigma \leq x \leq m + k\sigma \quad \text{[Equation 2]}$$

The sample mean of the maximum index, m, has a positive or negative value, so it should be considered as an absolute value. Considering the possibility that the maximum index samples are separated from the established search window center at first, the maximum offset of the maximum index samples, S', is established according to the confidence level. Therefore, the final search window, S, is found by increasing the maximum offset, S', by two times, wherein the maximum offset represents the amount that the maximum index samples are separated from the search window center.

That is, the search window, S, is estimated using the following equation 3 via the confidence interval calculated as above at step 250.

$$S' = |m| + \text{MAX}(|m - k\sigma|, |m + k\sigma|) \quad \text{[Equation 3]}$$
$$S = S'$$

As stated above, the present invention can establish the confidence interval from the search result outputted from the mobile station and estimate the search window. Therefore, the characteristic of the mobile station and/or the current radio morphology can be sufficiently considered and cope with the variable radio morphology. The present invention gathers the searcher-related data from the searcher of the mobile station directly and analyzes it to estimate the search window. Therefore, it is possible to establish the search window per radio morphology. It is also possible to improve the call quality by reducing the overload of mobile stations through the appropriate search window and by increasing the mean acquisition time necessary for acquiring the pilot signal and by increasing the detection probability.

While the invention has been shown and described with reference to a certain preferred embodiment thereof, it will be understood by those skilled in the art that various changes in form and detail may be made theein without departing from the spirit and scope of the invention as defined by the appended claims.

What is claimed is:

1. A method of establishing a search window size for a mobile station in a cellular system having a present radio morphology, said mobile station being provided with communication services from a plurality of base transceiver stations (BTSs), each of said plurality of BTSs having an inherent pilot signal, said mobile station searching for said pilot signal at each searcher position having a constant time interval within a search window on a time-axis, said method comprising the steps of:

finding a correlation energy value at each searcher position by which a searcher of said mobile station searches for pilot signals received from said plurality of BTSs at each searcher position within a predetermined first search window and outputting a result of the searching;

gathering said result of the searching outputted from said searcher of said mobile station using a diagnostic monitor (DM) connected to said mobile station; and estimating the size of a second search window to be applied to the present radio morphology based on the gathered result of the searching and applying the second search window size to said mobile station, wherein said step of gathering said result of the searching repeatedly gathers a maximum index samples, said maximum index samples including information denoting the location of a particular searcher position from the center of the first search window, and wherein the particular searcher position has the highest correlation energy value within the first search window.

2. The method as recited in claim 1, wherein said step of estimating the size of said second search window and applying the second search window size to said mobile station comprises the steps of:

considering a distribution of the gathered maximum index samples to find a maximum allowable offest value from the maximum index samples from a center of said first search window; and finding the second search window size by increasing the maximum allowable offset by two times and applying the second search window size to said mobile station.

3. The method as set forth in claim 2, wherein said step of considering a distribution of the gathered maximun index samples to find the maximum allowable offset comprises the steps of:

converting the distribution of the gathered maximum index samples to a log-normal distribution;

establishing an allowable confidence level value for the maximum index samples converted to the log-normal distribution;

finding a confidence interval for the maximum index samples from the established allowable confidence level value; and finding the maximum allowable offset from the found confidence interval.

4. A method of establishing a search window size of a mobile station in a cellular system having a present radio morphology, said mobile station being provided with communication services from a plurality of base transceiver stations (BTSs), each of said plurality of BTSs having an inherent pilot signal, said mobile station searching for said pilot signal at each searcher position having a constant time interval within a search window on a time-axis, said method comprising the steps of:

finding a correlation energy value at each searcher position by which a searcher of said mobile station searches for pilot signals received from said plurality of BTSs at each searcher position within a predetermined first search window;

gathering maximum index samples from said searcher of said mobile station using a diagnostic monitor (DM) connected to the mobile station, said maximum index samples including information which denotes the location of a searcher position from a center of the first search window, the searcher position having the highest correlation energy value within the first search window;

establishing a confidence level value, p, for the gathered maximun index samples;

calculating a mean value, m, and a standard deviation, $\sigma$, for the gathered maximum index samples;

calculating a confidence interval for the gathered maximum index samples using the established confidence level value, p, the calculated mean value, m and the standard deviation, $\sigma$; and estimating the size of a second search window to be applied to the present radio morphology using the calculated confidence interval and applying the estimated second search window size to said mobile station.

5. The method as recited in claim 4, wherein said step of calculating said confidence interval comprises the steps of:

converting a distribution of the gathered maximum index samples to a normalized log-normal distribution;

finding a value of k satisfying $1-2Q(k)=p$ where $Q(k)$ is a Q-function for any variable, k; and determining an interval as said confidence interval according to the values of m, k and, $\sigma$, said interval being greater than or equal to a value of $m-k\sigma$ and being less than or equal to a value of $m+k\sigma$.

6. The method as recited in claim 5, wherein said step of estimating the size of a second search window and applying the estimated second search window size to said mobile station comprising the steps of:

finding a maximum offset value from the maximum index samples from the center of said first search window according to the determined confidence interval; and finding said second search window size by increasing the maximum offset value by two times.

7. The method as recited in claim 6, wherein said step of finding a maximum offset value determines a value of S' as the maximum offset value, said value of S' being determined by $S'=|m|+MAX(|m-k\sigma|,|m+k\sigma|)$.

\* \* \* \* \*